Feb. 19, 1963   J. G. PETERSON   3,077,990
FILTER MEDIUM GUIDE
Filed March 7, 1960   2 Sheets-Sheet 1
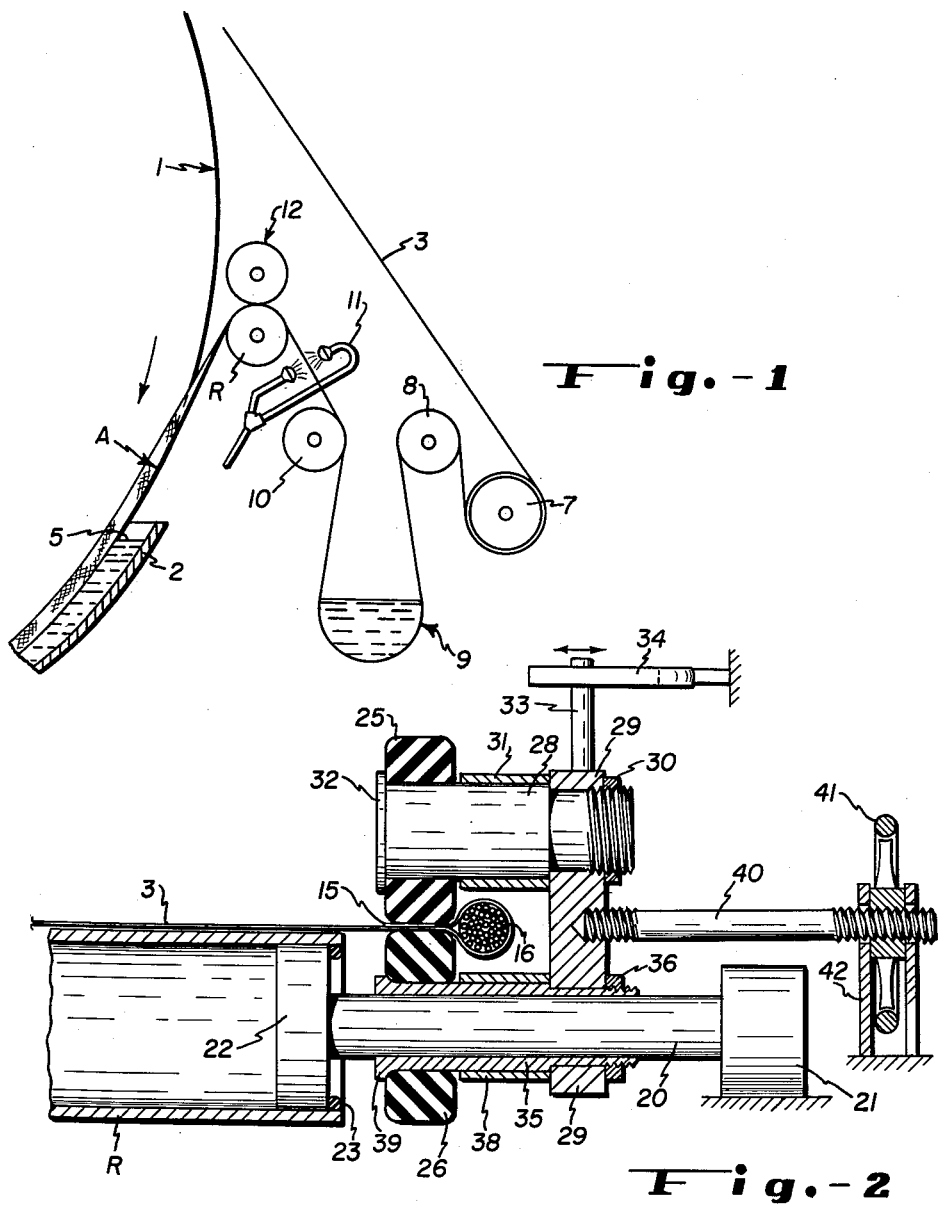
INVENTOR.
John G. Peterson
BY
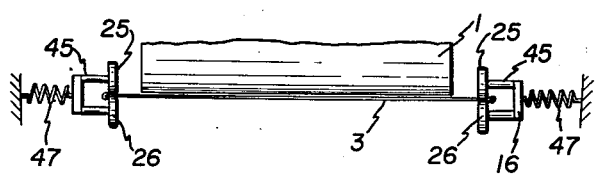
ATTORNEYS Feb. 19, 1963  J. G. PETERSON  3,077,990
FILTER MEDIUM GUIDE
Filed March 7, 1960  2 Sheets-Sheet 2

INVENTOR.
John G. Peterson
BY
McGrew & Edwards
ATTORNEYS

United States Patent Office 3,077,990
Patented Feb. 19, 1963

3,077,990
FILTER MEDIUM GUIDE
John G. Peterson, Salt Lake City, Utah, assignor to Peterson Filters and Engineering Company, Salt Lake City, Utah, a corporation of Utah
Filed Mar. 7, 1960, Ser. No. 13,129
2 Claims. (Cl. 210—401)

This invention relates to improvements in continuous filtering apparatus, and more particularly to improvements in rotary drum apparatus, especially drum filters having a cake discharge and filter medium cleaning section removed from the surface of the drum.

Rotary drum filters using a filter medium formed in an endless band or strip having a length substantially in excess of the circumference of the drum for passing through a cake discharge section spaced from the drum is well known. With such filtering apparatus, however, substantial difficulty has been experienced in maintaining the endless filter medium strip centered on the drum and as it passes through the discharge section. Since a vacuum filter has a drum having a perforated surface which must be covered by the filter medium to maintain suction in the drum for drawing filtrate through the filter medium, the filter medium must be correctly tracked so as to cover the drum surface during filtering operations. In such devices, the filter medium on leaving the drum is looped around and through a series of rollers for discharge of carried cake and eventually back onto the drum surface. As the filter medium returns to the drum surface, however, there is a definite tendency for the endless strip to run off the drum.

It is therefore an important object of the invention to provide a novel filter medium and mechanism for maintaining an endless filter medium centered on a rotary drum and through a discharge section spaced from the drum surface. The invention provides centering of the medium, eliminates wrinkling of the material of the filtering medium either on the drum or in the discharge section, and provides positive tracking for the medium onto the drum without training rods. The mechanism of the invention laterally stretches the filter medium, retarding blinding of its openings and provides for more complete cleaning of the filter medium prior to its return to the filter drum for additional filtering action.

These and other objects and advantages of the invention may be readily ascertained by referring to the following description and appended drawings in which:

FIG. 1 is a partial schematic view of a drum filter with a spaced apart cake discharger for an endless filter medium;

FIG. 2 is a detailed section of part of one embodiment of the invention, illustrating a filter medium tensioning and holding mechanism according to the invention;

FIG. 3 is a schematic view of a modified spring-loaded filter medium holding mechanism, for tracking and centering a filter medium on a drum and providing lateral tension on the medium;

Figure 4:
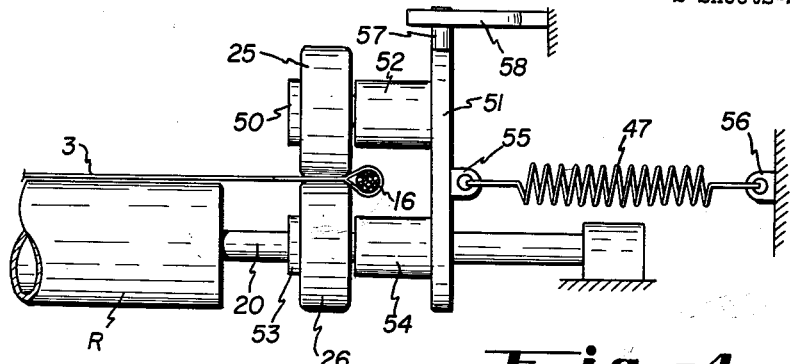
FIG. 4 is a partial detailed view of a modified spring-loaded mechanism for tracking and centering a filter medium.

In general, the cake discharger of the present invention is applicable to a rotary vacuum drum filter, rotary pressure drum filters, and other similar mechanisms utilizing an endless filter medium or cake supporting material of a length substantially greater than the circumference of the drum and a cake discharge mechanism spaced from the drum surface, as for example, rotary drum filters shown in Wilson, U.S. Patent No. 2,812,065 and Siebenthal, U.S. Patent No. 2,812,064. In the particular type of filter mechanism, a vacuum drum filter having a perforate cylindrical surface is partially immersed in a fluid to be filtered which is contained in a tank. The endless filter medium covers the mesh surface of the drum during its immersion in the fluid (slurry) and a part of the drum surface above the slurry to provide washing and/or air drying of the cake on the medium. The filter medium is then directed away from the surface of the drum through a series of loops wherein the cake is discharged, the medium is washed and then returned to the drum for subsequent filtering operation.

In the schematic illustration of FIG. 1, a drum 1 (partially shown) is mounted for rotation in a tank 2 for operation as a drum filter according to conventional practices. The Wilson and Siebenthal patents (referred to above) illustrate one mounting construction and means for operating such a drum filter. An endless filter medium 3 is looped around the drum 1 so that it covers the drum through a major part of an arc of revolution. The medium is withdrawn fro mthe drum at an upper point and it is returned to the drum at a point such as A immediately prior to its contact with a body of slurry 5. The filter medium completely covers the drum deck during the filtering portion of each cycle. In the cake discharge and cake washing section, the filter medium 3 passes over a discharge roller 7 where the filter cake is removed from the medium, either by the reverse bending of the medium or a sluicing fluid, which may be air or water, blown through the medium to remove the cake. The medium is then looped over a roller 8 leading an elongated, free loop 9 over a roller 10 and then past a spray system 11. The filter medium passes through a tracking, centering and tensioning mechanism shown generally by numeral 12 and returned to the filter drum. The centering and tensioning mechanism is explained in detail in detail below. The elongated loop 9 is normally filled with water, forming is called a water loop, shown and explained in detail in the Wilson and Siebenthal patents. The water loop maintains longitudinal tension on the filter medium by virtue of the weight of the water in the loop. The water in the loop may be either contained in an elongated tube or a free pool so that it washes the filter medium.

The filter medium which may be used with the device of the invention is an elongated strip of such material as woven nylon, felt, metallic cloth, screening, nylon taffeta of appropriate mesh, and similar types of filter medium known in the industry. The strip of filter medium is slightly wider than the width of the drum and is substantially longer than the circumference of the filter drum. Its ends are secured together forming an endless filter medium. The ends of the medium may be releasably secured together by means of a hookless fastener, slide fastener, lacing, or the like, as is known in the art. Both edges of the strip are folded back over an elongated core and fastened to the body or web of the strip leaving an enlarged edge, bead, or hem completely along each edge. A portion of such an edge is illustrated in FIG. 2, wherein the edge 15 of the material is turned back on itself around a cord 16. The edge of the material may be sewn to the body, or otherwise fastened to form a pocket around the cord 16. In place of the cord 16 a cable, which may be made of metal, fiber, plastic, rubber, or an endless helical spring may be used as the core for the hemmed edge. It is to be understood that both edges of the strip are so treated so as to provide the thickened edges on both sides of the medium.

In the embodiment illustrated in FIG. 2, the return idler "R," that is, the roller adjacent the vacuum drum from which the filter medium returns to the drum from the cake discharge section, is mounted on a shaft 20 which is journaled in a pillow block or bearings 21 for rotation. A disc 22 is mounted on the shaft 20, and the disc is pressed internally of the tubular roller R, retained in place by a weldment 23.

The filter medium 3 is maintained centered and laterally stretched by means of rollers 25 and 26 which are closely juxtaposed with the thickened edges 15 therebetween. Thus the core 16 bears against the outer surfaces of the rollers. Upper roller 25 is mounted on a shaft 28 which is mounted in an upright end plate 29 and held by a nut 30. A spacer 31 holds the roller in position, and a shaft stop 32 maintains the roller on the shaft 28. The end plate 29 is mounted on a hollow shaft 35, through which shaft 20 is journaled and is retained in position thereon by means of a nut 36. Roller 26 is, also, mounted and rotates on the hollow shaft 35 being retained in position by stop 39. A spacer 38 maintains positioning of the roller. A connecting rod 40 is threadedly attached to the plate 29 and is operatively engaged with an adjusting wheel 41 mounted in a stand 42 attached to the filter structure. The adjusting wheel is threadedly engaged with the connecting shaft 40 and provides means for adjustment of lateral tension on the filter medium as may be desired. The rollers 25 and 26 are preferably made of nylon, polytetrafluoroethylene plastic, rubber or equivalent material which is essentially non-abrasive toward the filter medium with no sharp corners.

The end plate 29 being mounted on a shaft requires some means for holding it. One such means is shown in FIG. 2, wherein a pin 33 guides in a stationary yoke 34. The pin 33 prevents rotation of the end plate, but is reciprocable in the yoke for tension adjustment of the filter medium.

Adjustment by the hand wheel moves the rollers laterally in relation to the drum (not shown in FIG. 2) and provides centering and/or tracking means for the filter medium as well as providing lateral tensioning on the medium immediately prior to its return to the drum. Thus stretch changes and variations in the medium during operation are readily compensated, as well as filter medium creep on the drum.

In the modification illustrated schematically in FIG. 3, a yoke 45 having upper and lower rollers 25 and 26 are mounted in a manner similar to that of FIG. 2 but, instead of the connecting rod 40, a helical spring 47 is interconnected with each yoke 45. Thus each side of the filter medium runs between the rollers with the core 16 held between the rollers so as to maintain the medium under essentially uniform tension, and it is automatically centered or tracked on the drum 1. For simplification of the illustration, the return roller R and means for mounting the yoke are not shown in FIG. 3, but shown in detail in FIG. 4.

The spring-loaded yoke mechanism is illustrated in detail in FIG. 4, wherein the roller 25 is mounted on a solid shaft 50 which in turn is mounted on plate 51. A spacer 52 maintains the roller 25 in position and end stop on shaft so holds it on the shaft. Roller 26 is mounted mounted on a hollow shaft 53 which is secured to the plate 51 and maintained in position by spacer 54. The shaft 53 is reciprocably mounted on the return roller shaft 20. The helical spring 47 is secured to an eye 55 on the plate 51 and to an eye 56 on the frame providing continuous and essentially uniform tension on the filter medium under the influence of the springs 47.

A pin 57 riding in arms of a stationary yoke 58 prevents rotation of the plate 51, in a manner similar to the device of FIG. 2. The yoke provides reciprocal movement of the plate 51 along shaft 20, but prevents rotation thereof.

Figure 5:
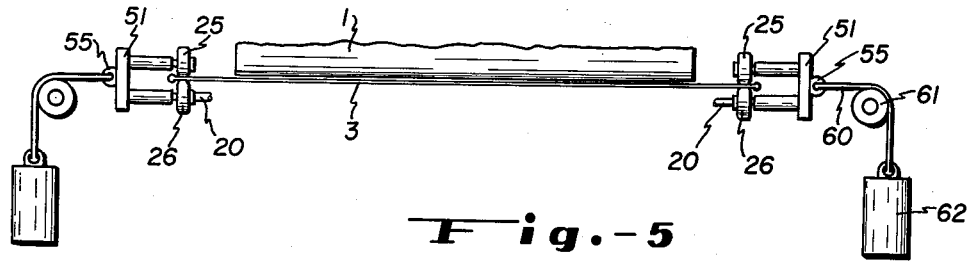
FIG. 5 is a schematic illustration of a gravity weighted filter medium centering and tensioning mechanism according to the invention.

In the modification illustrated in FIG. 5, weights operating over pulleys replace the helical spring on the device of FIGS. 3 and 4, also providing continuous tensioning on the filter medium 3. In this case the rollers 25 and 26, mounted similarly to the roller mount of FIG. 4, are mounted on a back plate 51 which in turn is reciprocably mounted over return roller shaft 20. A cable or line 60 mounted over a pulley 61 is secured to the eye 55 at one end and to a weight 62 at the other end. These opposed weights on the ends of the cable 60 provide lateral tension and tracking for the filter medium 3. The weights, of course, may be varied to provide proper tensioning under various conditions of operation.

Figure 6:
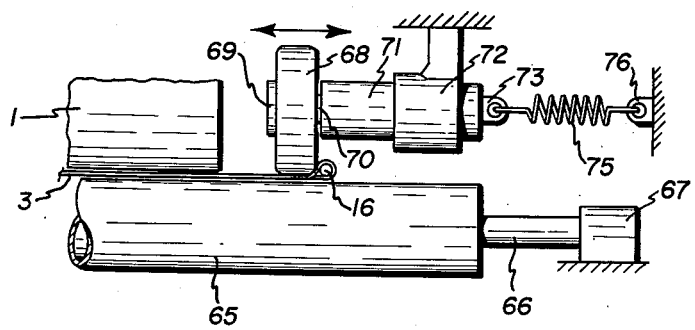
FIG. 6 is a partial detailed view of another spring loaded filter medium centering and tensioning mechanism.
Figure 7:
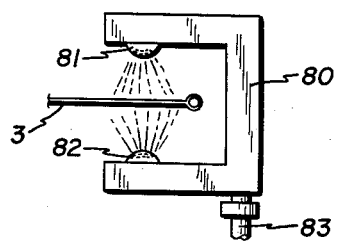
FIG. 7 is a schematic view of a filter medium cleaning spray mechanism according to the invention.

In the modification illustrated in FIG. 6, a return roller 65 is made substantially wider than the filter drum 1, and is mounted on a shaft 66 journaled for rotation in a pillow block or bearing set 67. The return roller 65 is mounted in a position adjacent the drum, similar to the return roller R, FIG. 1, and a single filter medium tensioning and restraining roller 68 is mounted adjacent each end of the return roller 65, in position to bear against and retain the filter medium edge 16 therebetween. Correct positioning maintains the edge core 16 on the outer side of the roller 68. The roller 68 is mounted on a shaft 69, which is shouldered at 70 to retain the roller 68 in position, and the large portion 71 of the shaft is reciprocably mounted in a stationary mount 72 which is secured to the frame. An eye 73 is secured on the end of the shaft 72, and a spring 75 is attached thereto to provide tension on the filter medium 3. The spring 75 is anchored in an eye 76 secured to the filter frame.

In the modification of FIG. 6 the return roller 65 coacts with the tensioning roller for providing tensioning on the filter medium. This provides a simplified construction for the centering and tensioning mechanism for the filter medium 3.

Cleaning sprays may be provided for the filter medium edge immediately prior to its entrance into the centering and tensioning rollers, and in one form a hollow yoke 80 is provided with upper and lower spray heads 81 and 82 mounted in position to spray the filter medium 3 passing therebetween. The hollow yoke is secured to a fluid source 83 by conventional means. The spray heads may be replaced with wiper blades where desired.

It is obvious that where desired the filter medium holding rollers or wheels may be journaled with bearing sets on their respective shafts. Further, the rollers or wheels may be made replaceable for varying conditions of service or operation.

In operation it has been found that the core or cord in the hem of each edge creeps in respect to the filter medium, probably due to the difference of effective diameter around the drum and rollers which increases the distance of travel in relation to the body of the filter medium itself. It is, therefore, preferable to have each hem or turned back edge loosely on the cord, and to have the core or cord continuous around each edge with minimum bulging at the core or cord joint. When a cord is used for the core, a smooth splice without knots or bulges permits the cord to flow through the hem, in relation to the filter medium, during operation. Thus with any core, whether cord, cable, helical spring, etc., the finished splice is preferably smooth and small so that the core freely moves through the hem without catching and bunching the filter medium.

While the invention has been described by reference to specific embodiments, there is no intent to limit the spirit or scope of the invention to the precise details so set forth.

I claim:

1. In a filter medium tracking and tensioning device for a rotary drum filter having a separate cake discharge section, an endless filter medium looped over the filter drum and extending through the cake discharge section, which filter medium includes a bead on each edge of the filter medium extending completely therearound, and a filter medium return roller mounted adjacent the filter drum, the improvement which comprises means for tracking the filter medium back to said drum inclusive of a pair of rollers mounted adjacent each end of the return roller, each pair of rollers being mounted in substantial contacting relation and mounted with the filter medium therebetween and in position to bear against the bead at the edge thereof, each said pairs of rollers being arranged to move laterally in respect to the path of travel of the filter medium, resilient means attached to said rollers in position so that the rollers bear against the bead at each side of the filter medium to stretch the filter medium therebetween and to center it in relation to the return roller and the filter drum, and means for supporting each pair of said rollers in position on said filter medium and biased against the adjacent bead at the edge thereof.

2. A device according to claim 1 in which each said pair of bead contacting rollers is spring biased laterally away from the filter medium so as to provide essentially uniform tensioning on the filter medium.

References Cited in the file of this patent

UNITED STATES PATENTS

| | | |
|---|---|---|
| 877,631 | Clark | Jan. 28, 1908 |
| 954,466 | Robinson | Apr. 12, 1910 |
| 2,330,923 | Robins | Oct. 5, 1943 |
| 2,880,875 | Alston | Apr. 7, 1959 |
| 2,909,273 | Smith | Oct. 20, 1959 |

FOREIGN PATENTS

| | | |
|---|---|---|
| 812,197 | Great Britain | Apr. 22, 1959 |